United States Patent [19]

Berbalk

[11] 4,261,234
[45] Apr. 14, 1981

[54] LATHE FOR MACHINING A CRANKSHAFT

[75] Inventor: Hermann Berbalk, Göppingen, Fed. Rep. of Germany

[73] Assignee: Gebrüder Boehringer G.m.b.H., Fed. Rep. of Germany

[21] Appl. No.: 67,336

[22] Filed: Aug. 17, 1979

[30] Foreign Application Priority Data

Aug. 21, 1978 [DE] Fed. Rep. of Germany ....... 2836598

[51] Int. Cl.³ .............................................. B23B 5/18
[52] U.S. Cl. ......................................................... 82/9
[58] Field of Search ...................................... 82/9, 1 C

[56] References Cited

U.S. PATENT DOCUMENTS

| 2,356,997 | 8/1944 | Groene | 82/9 |
| 2,499,509 | 3/1950 | Kendall | 82/9 |
| 3,789,709 | 2/1974 | Kendall et al. | 82/9 |
| 4,080,852 | 3/1978 | Heffron et al. | 82/1 C |

Primary Examiner—Leonidas Vlachos
Attorney, Agent, or Firm—Shlesinger, Fitzsimmons & Shlesinger

[57] ABSTRACT

A lathe for simultaneously machining the line bearings of a crankshaft is provided with a turret shaft rotatably mounted on a cross slide for rotation about an axis parallel to the spindle axis. This shaft carries a plurality of turrets each turret being provided with a set of cutting tools on its periphery and being fixed to the turret shaft. Upon withdrawal of the turrets from the workpiece the turret shaft can be indexed to thereby bring the next set of tools into position preparatory to the inward feed of the turret shaft for engagement of the tools with the crankshaft. Two sets of such turrets can be provided on opposite sides of the spindle axis for simultaneous cutting operation on opposite sides of each line bearing of the crankshaft.

4 Claims, 4 Drawing Figures

4,261,234

LATHE FOR MACHINING A CRANKSHAFT

BACKGROUND OF THE INVENTION

1. Field of the Invention

The instant invention relates to a lathe for simultaneously machining the line bearings of a crankshaft.

2. Description of the Prior Art

In a common type of lathe for simultaneously machining the line bearings of a crankshaft blank by a plurality of cutting blades, each cutting blade is rigidly mounted on a tool support fixed to a cross slide for feeding motion or pivotally mounted on a bed slide for feeding motion. The supporting means for fixing the cutting blades to such tool supports are frequently lacking the desired stability. This affects adversely the cutting capacity where hard metal inserts form the cutting edges of the blades. As a result inaccurate operation and breakage of the cutting blades are of frequent occurrence.

Moreover the common crankshaft lathes are frequently not capable of machining some or all of the line bearings without removing and reinserting the crankshaft blank because this would require excessive cutting power due to the width of the line bearings and due to the use of hard metal tips on the tools. In such cases different sets of line bearings must be cut in successive operations.

Moreover prior crankshaft lathes afford no possibility for performance, on the same crankshaft without removal of the same from the lathe, of successive operations such as cutting oil collars and cutting or rolling clearances or exchanging cutting blades rapidly.

SUMMARY OF THE INVENTION

It is an object of this invention to provide a crankshaft cutting lathe in which the cutting blades for cutting the line bearings and any surfaces of revolution of the crankshaft blank coaxial to the line bearings are very rigidly supported and can be easily exchanged and replaced by other cutting blades without any disassembling operation and without removal of the crankshaft from the lathe and reinsertion thereof. It is another object of this invention to so design a crankshaft cutting lathe that it is possible without removal and reinsertion of the crankshaft from and into the lathe to perform successive cutting operations.

I attain these and other objects by providing disc-shaped turrets on at least one cross slide each turret being provided with a peripherally distributed set of cutting blades for simultaneously machining the coaxial line bearings and other pins of a crankshaft, the turrets being fixed to a shaft journalled in bearings formed by the cross slide, the turret shaft being adapted to be clamped in selected angular positions.

Other objects of the invention and details thereof will appear from a detailed description of a preferred embodiment thereof illustrated in the drawings.

Figure 1:
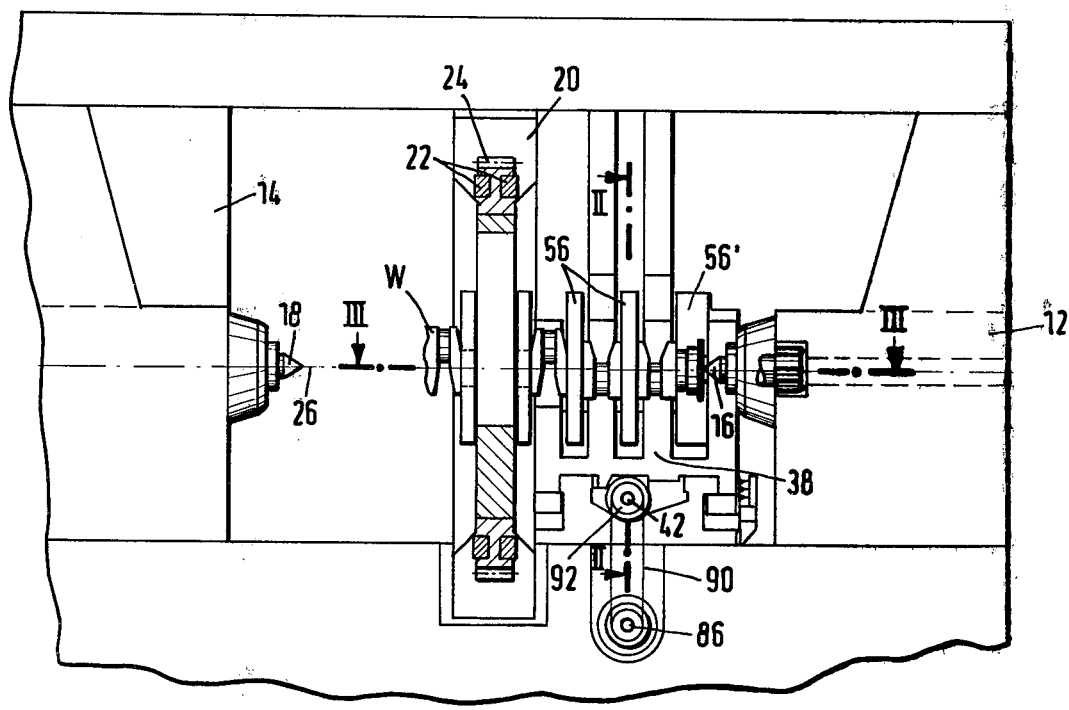
FIG. 1 is a side view of part of the novel lathe, partly in section, a crankshaft being inserted in the lathe for cutting operation to be performed thereon.

In a frame comprising a bed 10 and a pair of spaced columns 12 and 14 the workpiece formed by a crankshaft W is held between centers 16 and 18 mounted on center assemblies relatively adjustable along the common axis. Between these centers 16 and 18 a housing 20 is rigidly mounted on the bed 10 and accommodates driving means for rotating the crankshaft; such driving means comprise an annular gear 24 surrounding the spindle axis 26 of the crankshaft W in coaxial relationship and provided with chucking means for engagement with a crankpin of the crankshaft and with the crankarms carrying such crankpin. The gear 24 meshes with a spur gear 28 rigidly mounted on a shaft rotatably mounted in the bed 10 and adapted to be driven by a suitable driving motor. Below the axis 26 the bed 10 is provided with a ditch 30 extending parallel to this axis for receiving the chips. On either side of this ditch a plate-shaped base member 32, or 34 respectively is fixed upon the horizontal top face of the bed 10 between the housing 20 of the center drive and each of the two columns 12, 14, FIGS. 2 and 3. The top face of this base member 32, or 34 respectively is provided with horizontal guideways 36 extending transversely to the spindle axis of the lathe and lower than the same. A support 38 or 40 forming a cross slide is slidably guided on each of such guideways and is adapted to be driven by a feed spindle 42, or 44 respectively. This horizontal spindle is rotatably but non-shiftably mounted in a recess of the base member transversely to the spindle axis 26 and passes through a downwardly extending annular boss 46 of the support 38 or 40. This boss and the feed spindle are each provided with an annular groove accommodating an endless row of antifriction balls rolling in these grooves and forming a positive driving connection of the feed spindle with the cross slide thereabove.

Each of the two cross slides 38 and 40 is provided on its top with a plurality of coaxial annular projections forming bearings 48 or 50 respectively in which turret shafts 52, or 54 respectively, are journalled so as to extend parallel to the spindle axis 26 and preferably within a comon horizontal plane with such spindle axis. These bearings 48 and 50 are spaced a distance from the spindle axis 26 which is larger than the radial dimensions of the crankarms of the workpiece. Therefore, the crankshaft including its crankarms is accommodated between the projections 48 and 50 forming the bearings of the turret shafts 52, 54. Each turret shaft 52, or 54 respectively, carries a plurality of disc-shaped turrets 26, or 58 respectively, which are fixed to the turret shaft, each turret extending between the crankarms which are connected by the coaxial bearing pins Z to be machined. Each of the two turret shafts 52 and 54 carries additionally a disc-shaped turret 56' or 58' respectively fixed to the shaft. This additional turret serves to machine an end pin of the crankshaft.

Each disc-shaped turret is provided with a peripheral set of cutting blades 60 or blade holders 62 each of such holders carrying a cutting blade mounted thereon in fixed or adjustable relationship. In the embodiment shown each of such sets comprises four cutting blades or cutting blade holders. Therefore, an indexing rotation of the turret shafts 52, or 54 respectively, will replace a cutting tool on a turret in cutting relationship to the crankshaft by the following cutting tool on the same turret.

In the embodiment shown the indexing angle amounts to 90°.

Figure 4:
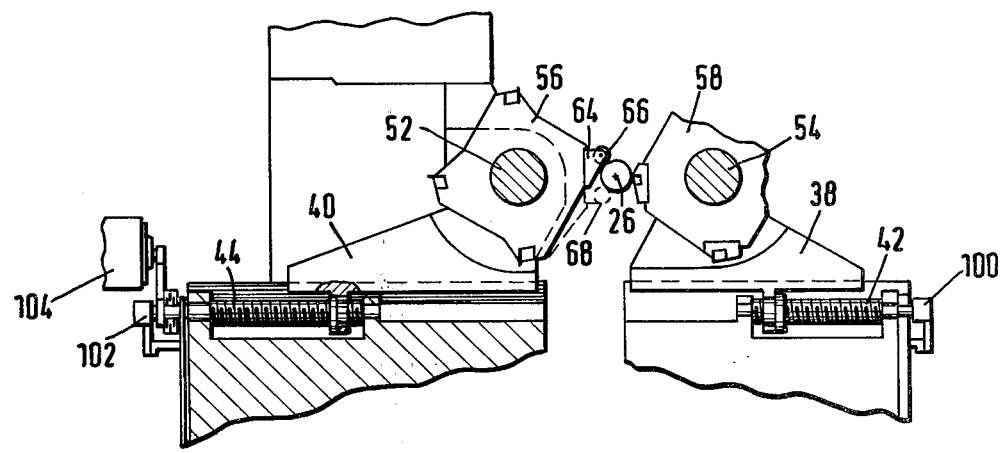
FIG. 4 illustrates a modification in a manner similar to a portion of FIG. 2.

In the embodiment illustrated in FIG. 4 one of the cutting blades of the turret 56 is replaced by a bracing device 64 in which a roller 66 is rotatably mounted. This bracing device engages the peripheral surface of the crankshaft line bearing being machined by a cutting blade on the turret 58 located opposite to the bracing element. This serves the purpose to brace the crankshaft against the cutting force exerted by the turret 58. The bracing device 64 may be modified by the provision thereon of a second bracing roller 68.

Each of the two turret shafts 52, 54 may be fixed on its supporting cross slide 40, or 38 respectively by clamping means which may be actuated by pressure fluid and are not shown in the drawings. Moreover, each cross slide is provided with a movable pin 70 operable by fluid pressure so as to engage a radial bore of a disc 72 mounted on and fixed to the turret shaft. The disc 72 may be provided with a set of four such bores. This disc 72 forms part of the indexing mechanism and serves the purpose of accurately arresting the turret shaft in the proper angular position.

Moreover each turret shaft 52, or 54 respectively carries a gear 74 fixed thereon. A second gear 76 is rotatably mounted on the column 12 in a position within the path described by the gear 74 on movement of the cross slide carrying it. Therefore, the gears 74 and 76 will engage upon withdrawal of the cross slide from the crankshaft through the distance 78. The shafts of the gears 76 are geared to an indexing mechanism not shown and can be driven by the same, when the gears 76 and 74 are in engagement with each other.

Figure 2:
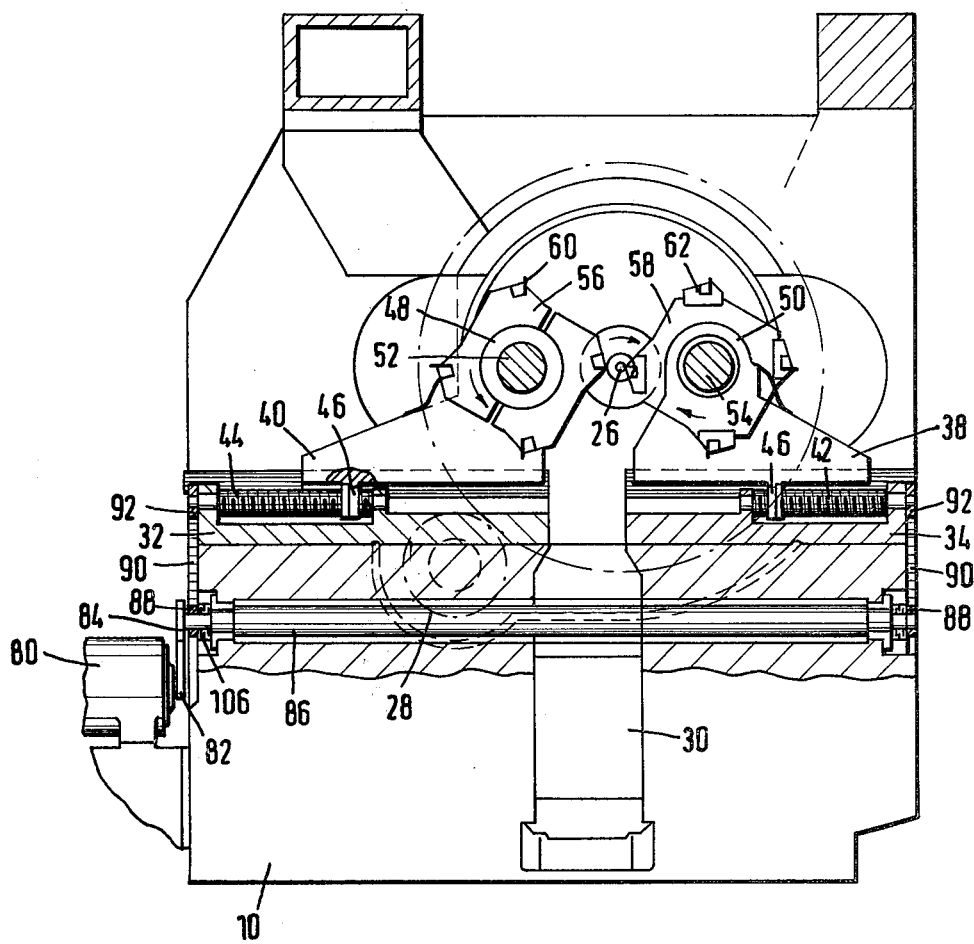
FIG. 2 is a vertical section along the line II—II of FIG. 1.
Figure 3:
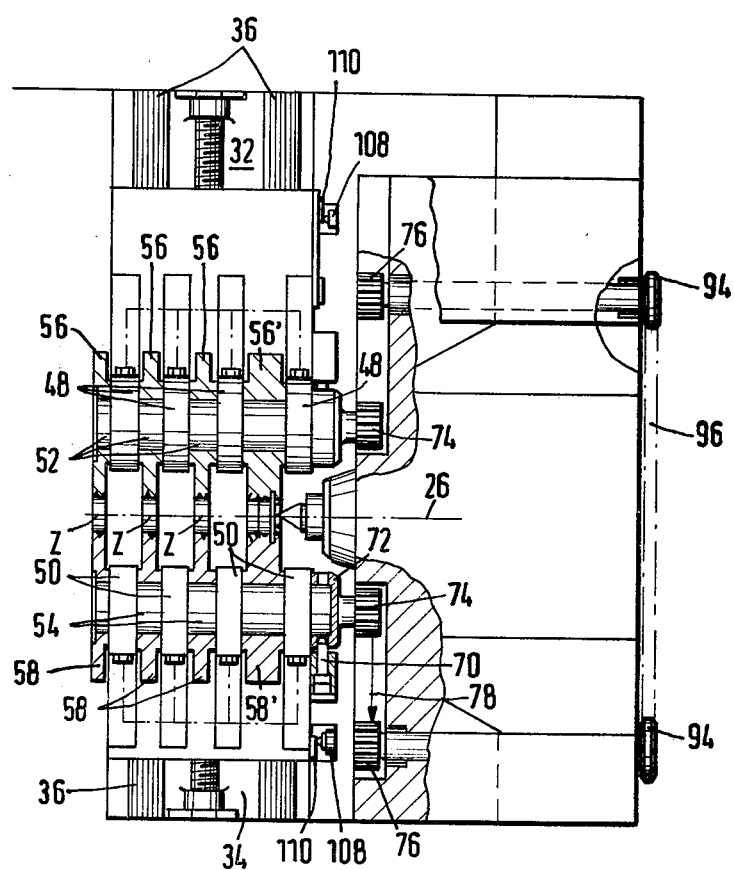
FIG. 3 is a horizontal section taken along the line III—III of FIG. 1, the left-hand portion of the machine being omitted

A feed motor 80, FIG. 2, mounted on the bed serves to drive the feed spindles 42 and 44 and, for this purpose, is geared by means of meshing spur gears 82 and 84 to a horizontal shaft 86 extending through the bed transversely to the spindle axis 26. Each end of this shaft carries a sprocket fixed thereto. A chain 90 driving the sprocket connects this sprocket with another sprocket 92 fixed to the feed spindle.

An indexing mechanism is drivingly connected with the shafts of the two gears 76 by sprockets 94 located on the outside of the column 12 and by a chain 96. As the indexing mechanism is of a known type, it need not be described and is not shown in the drawings.

In FIG. 4 an embodiment of the invention is shown in which measuring means are co-ordinated to the feeding means for measuring the feed of the cross slide 38. This measuring means comprise a code sender 100. The similar code sender 102 is provided to measure the length of feed of the cross slide 40. Impulses representing the result of the measurements by a code are so introduced into suitable controlling means not shown that the engagement of the bracing element 64, 66 with the machined periphery of the crankshaft is ensured. This controlling means controls the feed motors 104 each of which drives one of the two feed spindles 44 and 42.

If the operator wishes to prevent one of the turret shafts 52 and 54 from being indexed, the feed spindle for feeding the cross slide 38 or 40 of this turret shaft is disconnected from the motor 80 by disengagement of a clutch 106 before the gear 74 will engage the gear 76 upon the return of the cross slide. This clutch 106 interposed between the shaft 86 and the sprocket 88 is controlled by limit switches 108 and 110, FIG. 3.

From the above it will appear that my novel machine is capable of simultaneously machining one or more coaxial bearings or other pins coaxial therewith and to brace such bearings or pins during the cutting operation. By indexing one or more of the turret shafts 52 and 54 any desired cutting blades 60, 62 may be selected for the cutting operation. The disc-shaped turrets can also be provided with means other than cutting blades such as rolling tools for machining cut surfaces by a rolling operation.

Having described specific embodiments of this invention it can be appreciated that equivalent structures and variations thereof may be substituted for those described and discussed above. All such variations and equivalent structures are intended to be included within the scope of protection sought herein as described in the claims below.

What I claim is:

1. A lathe comprising a bed, a spindlestock thereon, a work spindle rotatably mounted in said spindlestock for rotation about a spindle axis, means for mounting a crankshaft blank on said work spindle for common rotation therewith, at least one cross slide on said bed mounted for movement thereon transversely to said spindle axis, a plurality of coaxial bearings fixed to said cross slide, the common axis of said bearings extending parallel to said spindle axis, a turret shaft rotatably mounted in said bearings, turrets mounted on said turret shaft between said bearings, each turret being fixed to said shaft and being provided with a set of circumferentially distributed mounting means for mounting cutting tools on said turret, an indexing mechanism for stepwise rotation of said turret shaft, the distance of the cutting edges of said tools from said turret shaft exceeding the length of the crankarms of said crankshaft blank and the distance between said turrets corresponding to the distance between the line bearings of said crankshaft blank.

2. A lathe as claimed in claim 1 further comprising a first gear on said turret shaft, a second gear forming part of said indexing mechanism and being mounted on the frame composed of said bed and of said spindlestock in the path on which said first gear travels during movement of said cross slide in a direction away from said spindle axis for engagement with said second gear.

3. A lathe as claimed in claim 1 further comprising a second cross slide on said bed mounted for movement thereon transversely to said spindle axis, a plurality of coaxial bearings fixed to said second cross slide, the common axis of said bearings extending prallel to said spindle axis, a second turret shaft rotatably mounted in said last mentioned bearings, a second set of turrets mounted on said second turret shaft between said last mentioned set of bearings, at least some of said second turrets being provided with bracing devices for engagement with said crankshaft blank for the purpose of bracing the same.

4. A lathe as claimed in claim 3 further comprising feeding means for feeding each of said cross slides towards said spindle axis and measuring means co-ordinated to said feeding means for measuring the feed of said first cross slide, and controlling means controlled by said measuring means and co-ordinated to the feeding means of said second cross slide for controlling the feed thereof in dependence of the feed of said first cross slide to thereby keep said bracing devices in engagement with the periphery of the line bearing being cut.

* * * * *